(12) United States Patent
Tueshaus (10) Patent No.: US 8,731,786 B2
(45) Date of Patent: *May 20, 2014

(54) INDUSTRIAL TRUCK CONTROL SYSTEM

(75) Inventor: Bernd Tueshaus, Moosburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/396,332

(22) Filed: Feb. 14, 2012

(65) Prior Publication Data

US 2012/0143446 A1 Jun. 7, 2012

Related U.S. Application Data (63) Continuation of application No. 11/845,995, filed on Aug. 28, 2007, now Pat. No. 8,165,746.

(30) Foreign Application Priority Data

Aug. 28, 2006 (DE) .......................... 10 2006 040 197

(51) Int. Cl.
  *G06F 7/70* (2006.01)
  *G06F 19/00* (2011.01)
  *G06G 7/00* (2006.01)
  *G06G 7/76* (2006.01)

(52) U.S. Cl.
  USPC .......................................................... 701/50

(58) Field of Classification Search
  USPC ................... 701/23, 25, 26, 28, 50
  See application file for complete search history.

(56) References Cited

U.S. PATENT DOCUMENTS

| | | | | |
|---|---|---|---|---|
| 4,411,582 | A * | 10/1983 | Nakada | 414/636 |
| 4,598,797 | A * | 7/1986 | Schultz | 187/223 |
| 4,634,142 | A | 1/1987 | Woods et al. | |
| 4,809,178 | A | 2/1989 | Ninomiya et al. | |
| 5,938,710 | A | 8/1999 | Lanza et al. | |
| 5,944,132 | A * | 8/1999 | Davies et al. | 180/168 |
| 6,164,223 | A * | 12/2000 | Eriksson | 111/200 |
| 6,173,231 | B1 | 1/2001 | Chojnacki | |

(Continued)

FOREIGN PATENT DOCUMENTS

| | | |
|---|---|---|
| DE | 10 2005 024 880 A1 | 12/2006 |
| EP | 0 795 514 A1 | 9/1997 |

(Continued)

OTHER PUBLICATIONS

Search Report Application No. DE 10 2006 040 197.2.
Search Report Application No. EP 07 01 6765.

*Primary Examiner* — Khoi Tran
*Assistant Examiner* — Nicholas Kiswanto
(74) *Attorney, Agent, or Firm* — Rothwell, Figg, Ernst & Manbeck, P.C.

(57) ABSTRACT

The present invention relates to an industrial truck control system (10) for influencing the driving operation of an industrial truck (A, B) according to irregularities along the route to be traveled by the industrial truck (A, B), the system comprising a sensor device (14) for recording irregularities along the route in assignment to the position of irregularities concerned, a memory device (16) for storing the data recorded by the sensor device, and means (16) for influencing the driving operation of the industrial truck (A, B) in dependence on the respective position of the industrial truck (A, B) and according to the data of the sensor device (14) stored in the memory device (16).

22 Claims, 4 Drawing Sheets

(56) References Cited

U.S. PATENT DOCUMENTS

| | | | |
|---|---|---|---|
| 6,194,860 B1* | 2/2001 | Seelinger et al. | 318/587 |
| 6,321,147 B1 | 11/2001 | Takeda et al. | |
| 6,539,294 B1* | 3/2003 | Kageyama | 701/23 |
| 6,678,394 B1* | 1/2004 | Nichani | 382/103 |
| 6,832,139 B2* | 12/2004 | Johnson et al. | 701/23 |
| 6,938,829 B2* | 9/2005 | Doherty et al. | 239/1 |
| 7,344,037 B1* | 3/2008 | Zakula et al. | 212/344 |
| 7,656,271 B2* | 2/2010 | Ehrman et al. | 340/5.8 |
| 2003/0024132 A1* | 2/2003 | Kokura et al. | 33/712 |
| 2004/0122580 A1 | 6/2004 | Sorrells | |
| 2005/0076054 A1* | 4/2005 | Moon et al. | 707/103 Y |
| 2006/0058921 A1* | 3/2006 | Okamoto | 700/255 |
| 2008/0011554 A1* | 1/2008 | Broesel et al. | 187/224 |

FOREIGN PATENT DOCUMENTS

| | | |
|---|---|---|
| EP | 0800129 A1 | 10/1997 |
| EP | 1557318 A2 | 7/2005 |
| JP | 07277699 A | 10/1995 |
| JP | 10082720 A | 3/1998 |
| JP | 2005230032 | 9/2005 |

* cited by examiner

INDUSTRIAL TRUCK CONTROL SYSTEM

CROSS-REFERENCE TO RELATED APPLICATIONS

This application is a continuation of U.S. Ser. No. 11/845,995 filed Aug. 28, 2007, which claims priority of German Application number 102006040197.2, filed Aug. 28, 2006, which is incorporated by reference in its entirety.

The invention relates to an industrial truck control system for influencing the driving operation of an industrial truck according to irregularities along the route to be traveled by the industrial truck.

Industrial trucks of the type considered here are used for example in warehouses or in outdoor goods storage depots for travelling generally at the highest possible speed to transport items as efficiently as possible to and from their storage locations. In general, various industrial trucks are used, steered by a driver or guided automatically, for example along induction loops or the like.

It has been found in day-to-day use that, in particular in the case of manually operated industrial trucks, the knowledge that a driver has with respect to the route to be traveled can be useful, for example for avoiding potholes or driving through them more slowly. However, it is often the case that the routes are traveled at excessive speed without regard to unevennesses of the ground, such as for example potholes or bumps, and without regard to obstacles possibly lying along the routes, such as for example pallets of items protruding from a rack or items placed alongside a rack.

If sections of a route where the ground is uneven are traveled through at very high speed, the industrial truck and the driver may be exposed to severe shocks, which in the case of the vehicle can lead to greater wear, in particular of the wheel suspension, and in the case of the driver can lead to an increased health risk, in particular including long-term damage to the spinal column. Furthermore, it may happen that, when travelling at high speed over unevennesses of the ground, an item loaded on the load part may be damaged by vibrations. In the worst case, the loaded item may also fall down.

The object of the invention is therefore to provide an efficient industrial truck control system of the type mentioned at the beginning for an industrial truck, in order to ensure less stressful driving operation for the vehicle and the driver.

This object is achieved by an industrial truck control system for influencing the driving operation of an industrial truck according to irregularities along the routes to be traveled by the industrial truck, wherein the control system comprises a sensor device for recording irregularities along the route in assignment to the position of irregularities concerned, a memory device for storing the data recorded by the sensor device, and means for influencing the driving operation of the industrial truck in dependence on the respective position of the industrial truck and according to the data of the sensor device stored in the memory device.

Such an industrial truck control system makes it possible to adapt the driving operation of the industrial truck to recorded and stored irregularities. It is advantageous in particular that the data on the irregularities can be stored in the control system over a relatively long period of time, so that they are permanently available and continuous recording of data during normal driving operation is not absolutely necessary once the control system has been set up in the first instance. It goes without saying, however, that it is preferred if the stored data on irregularities are kept up to date, i.e. periodically updated, so that the control system can as far as possible provide the actual situation along the routes to be traveled for controlling driving operation.

The sensor device may preferably comprise optical and/or electromagnetic and/or mechanical sensors.

Conceivable here, for example, are cameras which take pictures of the surroundings of the route to be traveled or scanners which scan the surroundings of the routes and generate three-dimensional data. Furthermore, in particular on an industrial truck, piezoelectric shock sensors or spring-like mechanical sensors may be used for recording potholes.

In order to be able to determine the position of the industrial truck and of irregularities, it is proposed that the sensor device has at least one sensor for determining the position of the industrial truck. Such a position sensor may be, for example, a GPS sensor, as long as the depot allows the use of GPS, or else other sufficiently well-known position determining sensors may be used, such as for example tracking systems in warehouses, radio-based locating systems or the like.

As a development, it is proposed that the type of irregularities concerned can be recorded automatically or by manual input. Unevennesses of the ground along the route or else narrow points, obstacles and the like along the route can be recorded here as irregularities.

Depending on the configuration of the industrial truck control system, the recorded and stored data on irregularities can be automatically evaluated, so that a classification of recorded irregularities is made possible. If the automatic evaluation detects an irregularity that is unknown to it, he can be determined in terms of its type and classified, for example, by manual input of an operator. On the basis of such classifications of irregularities, adapted control data can then be determined for driving operation.

The control data for driving operation of the industrial truck that can be influenced by the influencing means preferably comprise at least data for controlling the speed of the industrial truck and/or data for controlling the lifting height of a load part of the industrial truck and/or data for steering the industrial truck.

If, for example, both the speed and the lifting height can be controlled, it is possible to reduce the speed of the industrial truck automatically before driving through a pothole and possibly also to limit the height of the load part with raised load to a height that is uncritical for this driving situation, or if need be to lower it to this lifting height. If a pothole has a critical depth, so that driving through the pothole entails a high risk of accident, it is also conceivable for the industrial truck to be stopped temporarily after a first speed reduction in an area before the pothole.

The control data for driving operation can preferably be influenced automatically by the influencing means. This is intended to avoid overriding of the driving control by the driver, so that the wear, the health risk for the driver and the risk of accident can be effectively reduced. As already indicated, this automatic influencing may comprise a speed reduction or limitation, and/or a lifting height reduction or limitation and/or a steering angle setting, so that it is possible to travel safely over or around or through obstacles, narrow points, potholes and similar irregularities.

It is preferred for the industrial truck control system to be a component part of the industrial truck and to be taken along by it. In such a configuration, the industrial truck comprises all the system components required for the data recording, data storage and evaluation, so that the stipulation of the control data for driving operation can be performed on board.

As an alternative to this, it is also possible for the industrial truck control system to be configured at least partially as a non-vehicle-bound device, wherein a communication link between the industrial truck and the non-vehicle-bound device can be set up for the two-way exchange of recorded data and/or control data for driving operation.

An example of a possible non-vehicle-bound device is a central computer that is installed in an operations room at the depot and on which the recorded data are stored and evaluated. Furthermore, sensors for recording irregularities may also be fitted on racks, on a warehouse ceiling or at other suitable places and be in connection with the central computer. If the industrial truck has a shock sensor, the data recorded by the industrial truck can be transmitted to the central computer by means of a communication link, in particular a radio link. The central computer itself can send control data on the driving operation via the communication link to the industrial truck, so that the latter is operated according to all the irregularities recorded and stored in the central computer.

In order to permit the operation of a fleet of industrial trucks stationed at a depot, the control system may be set up for influencing the driving operation of a number of industrial trucks. In this case, the control data for the driving operation of a number of industrial trucks may come from the industrial truck that has the control system described above on board it or from the central computer. It should be noted in this respect that the proposed control system may be designed in such a way that it can communicate with industrial trucks of different types and/or different manufacturers, so that a heterogeneous fleet of industrial trucks that are not of the same type can be controlled in the same way in their driving operation according to stored irregularities.

The object on which the invention is based is also achieved by an industrial truck that is equipped with an alternative to the control system described above, that is to say an on-board control system or an at least partially central control system, wherein such an industrial truck, as already indicated, can also communicate with further industrial trucks that do not have the on-board control system sensors referred to for data recording.

The invention also relates to a fleet of industrial trucks comprising a number of industrial trucks that can be influenced in their driving operation by a control system described above, wherein at least one of these is an industrial truck with the on-board control system or with at least one sensor for data recording and transmission to the central computer.

For operating the industrial truck control system described, further proposed is a method in which data on irregularities along a route to be traveled by an industrial truck are recorded in assignment to the position of irregularities concerned, wherein the recorded data are stored by the memory device and processed by the influencing means in such a way that control data for influencing the driving operation of the industrial truck are determined from the recorded data.

The recorded data and/or the control data for driving operation may in this case be transmitted to the industrial truck and/or to further industrial trucks and/or to a central computing unit.

According to a particularly preferred development, the data recording is carried out during a learning trip with an industrial truck that has an on-board control system or at least one sensor for data recording.

The invention is described below on the basis of an exemplary embodiment with reference to the accompanying figures.

Figure 1:
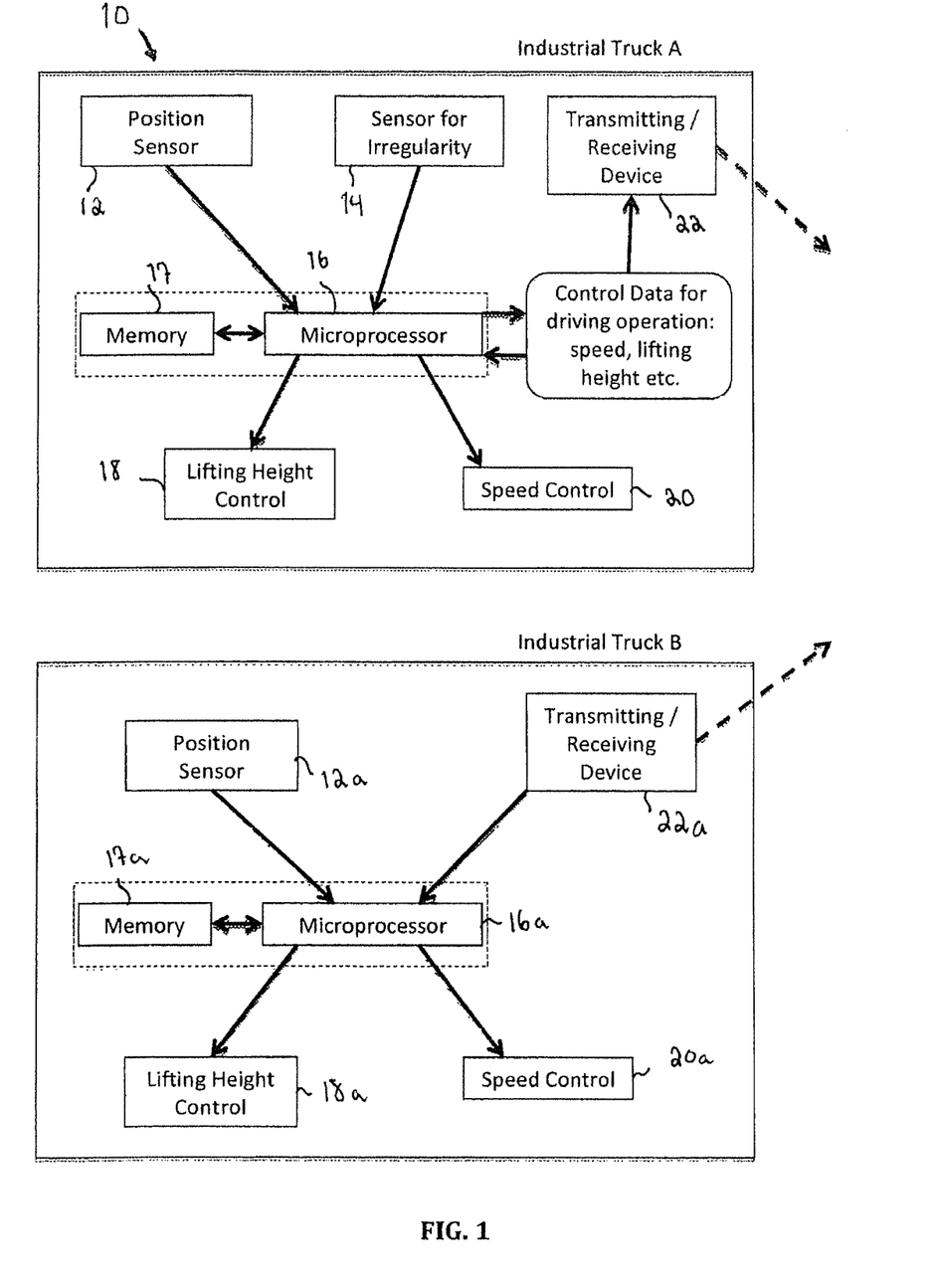
FIG. 1 is a functional diagram of an on-board control system in an industrial truck and of communication with a further industrial truck.

FIG. 1 shows a simplified functional diagram of an embodiment of an industrial truck control system 10 that is accommodated in an industrial truck A. The control system 10 has a position sensor 12 for determining the position of the industrial truck and a sensor for irregularities 14, which can record potholes, obstacles and the like. A number of sensors of different types may also be provided for the recording of irregularities, such as for example imaging sensors, electromagnetic sensors and/or mechanical sensors. The recorded position of the industrial truck A and irregularities recorded by the sensor 14 are transferred to a microprocessor 16, which can calculate the position of the irregularity in dependence on the position of the industrial truck. The recorded data on the irregularities are stored in a suitable way, for example on an adequately large flash memory, a hard disk or the like, which in the present embodiment is assigned to the microprocessor 16. The microprocessor 16 calculates from the stored data for irregularities control data for driving operation, such as for example reduced and/or limited speeds in the area of potholes or reduced or limited lifting heights in the area of obstacles.

The control data determined in this way for driving operation are used on the one hand for controlling the driving of the industrial truck A, wherein the microprocessor transmits corresponding signals or data to a lifting height controller 18 or a speed controller 20. On the other hand, the control data for driving operation may be transmitted via a transmitting/receiving device 22 to a transmitting/receiving device 22a of a further industrial truck B, for example via a radio link.

The control data arriving in the transmitting/receiving device 24 of the industrial truck B are transferred to a microprocessor 16a and stored in a suitable way. As soon as industrial truck B, which likewise has a position sensor 12a, so that the position of the industrial truck B can be determined at any time, comes into the area of an irregularity, it is controlled in the same kind of way as industrial truck A on the basis of the control data for driving operation. The microprocessor 16a in this case transmits corresponding signals/data to a lifting height controller 18a or to a speed controller 20a of the industrial truck B.

Since the industrial truck A has the sensors 14 required for recording irregularities, a learning trip for the route to be traveled by industrial trucks A and B can be carried out with the industrial truck A. During this trip, all the relevant irregularities are recorded and control data for the driving operation of the two industrial trucks are derived according to these irregularities.

It goes without saying that there may also be a number of industrial trucks B, which receive control data for driving operation from the industrial truck A. It is also noted that the industrial trucks B do not necessarily have to be of the same type. It is quite conceivable for different industrial trucks to be present in a fleet, having standardized control systems, for example CAN buses, and standardized interfaces, in particular for the communication with one another or with a control centre.

Figure 2:
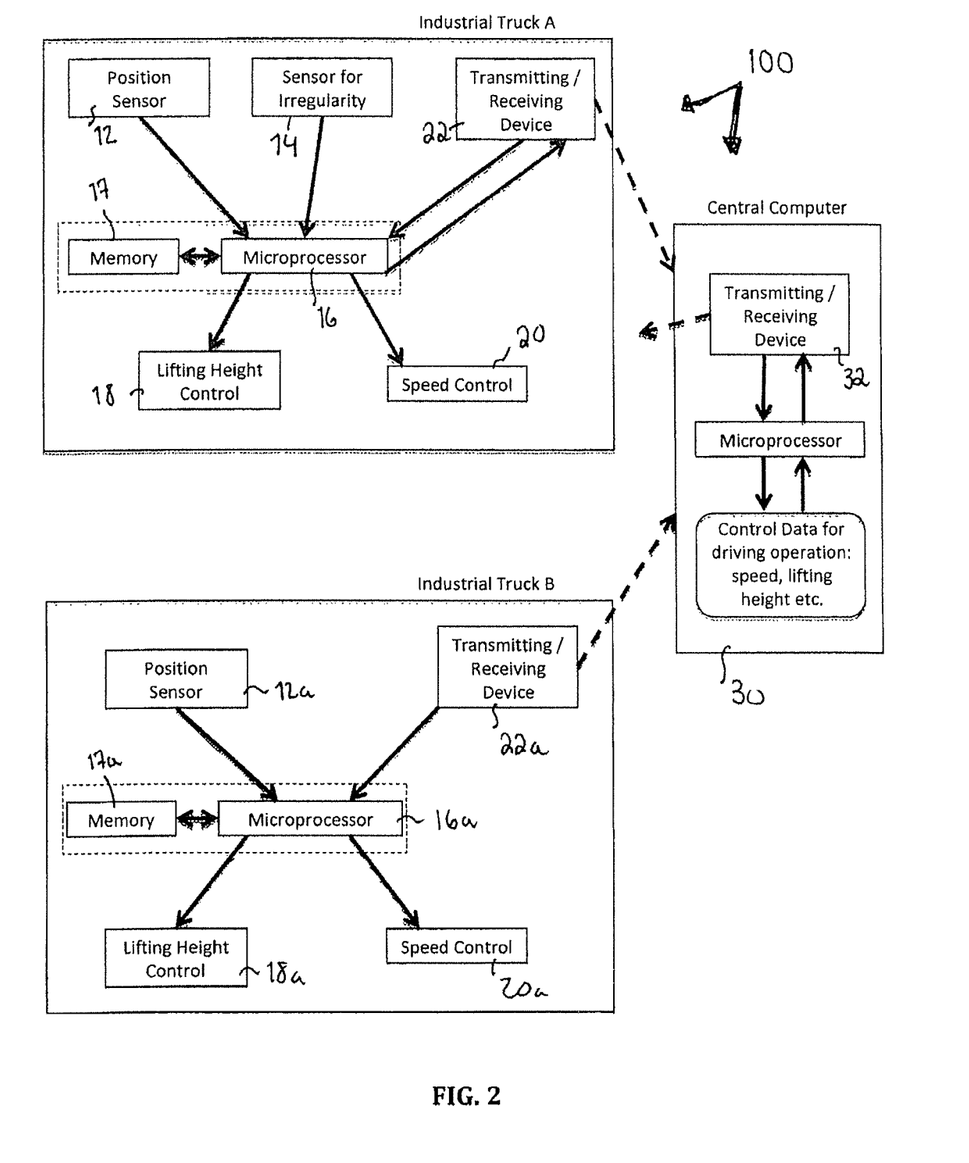
FIG. 2 is a functional diagram of a control system distributed between an industrial truck and a central computer and of communication with a further industrial truck.

An alternative embodiment of the invention is denoted in FIG. 2 as control system 100, which is implemented partly in the industrial truck A and partly in a central computer 30. Here, too, the industrial truck A comprises the position sensor 12, and sensors for irregularities 14, which transmit recorded data to the microprocessor 16. The recorded data are then transmitted from the microprocessor 16 to the transmitting/receiving unit 22 and transmitted from the latter to a transmitting/receiving device 32 of the central computer 30. A microprocessor 34 of the central computer 30 processes the received data on recorded irregularities and determines the control data for driving operation. The central computer may then transmit the driving operation control data via its transmitting/receiving device 32 to the transmitting/receiving devices 22, 22a of the two industrial trucks A and B, so that these can be controlled according to the recorded irregularities, as already described with reference to FIG. 1.

Figure 3:
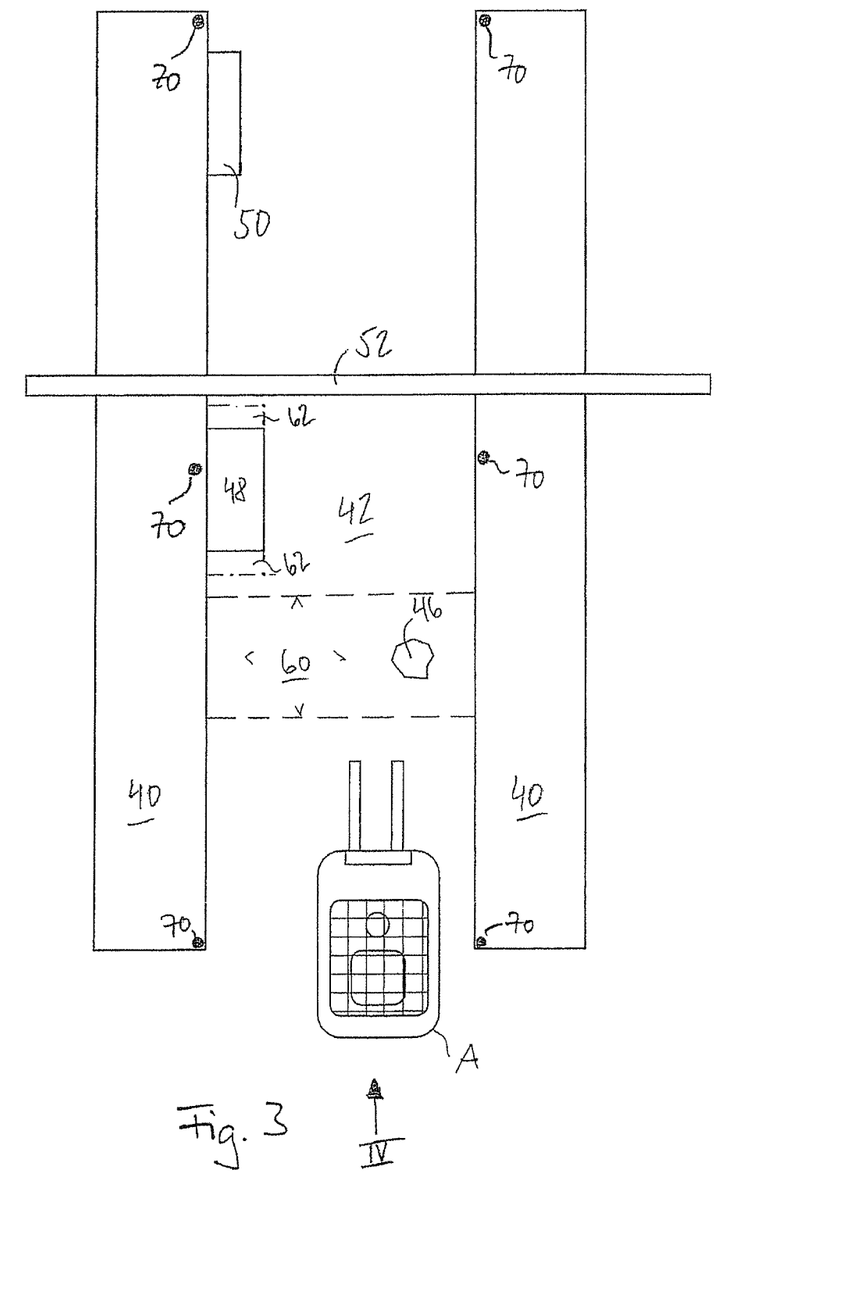
FIG. 3 is a simplified schematic plan view of an industrial truck between two racks of a warehouse.
Figure 4:
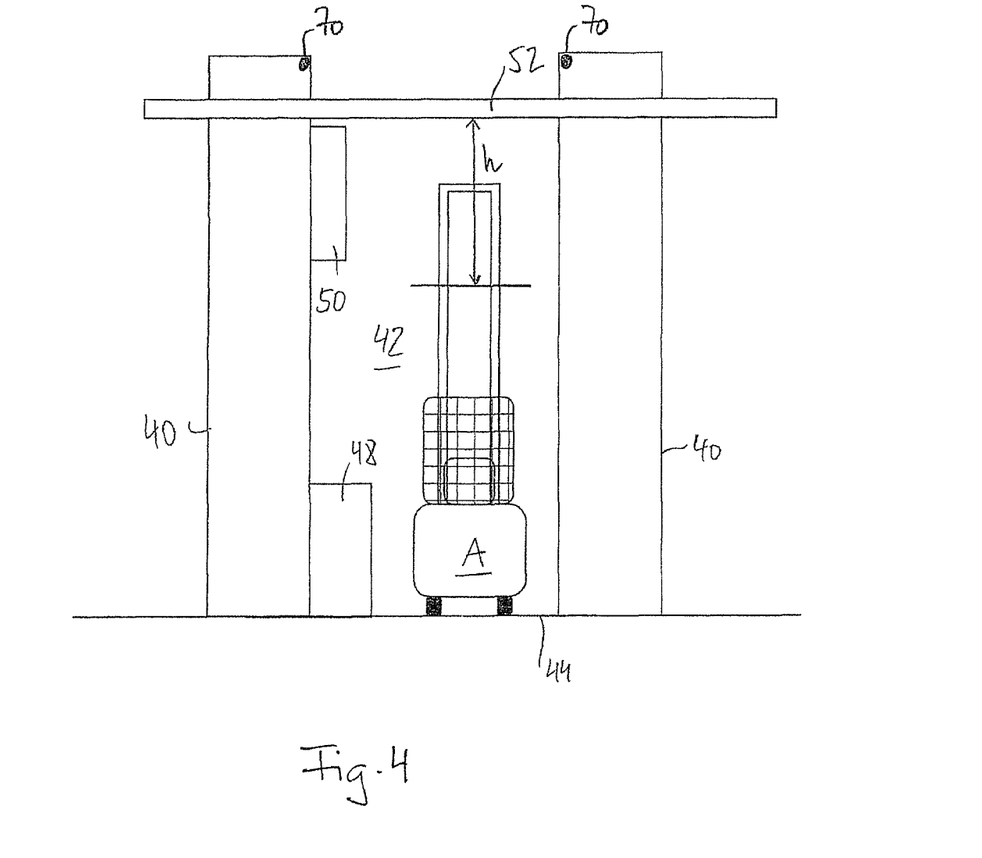
FIG. 4 is a simplified schematic elevation in the direction of the arrow IV of FIG. 3.

Conceivable cases of irregularities are to be explained on the basis of FIGS. 3 and 4. FIG. 4 thereby represents an elevation corresponding to the arrow IV of the plan view of FIG. 3.

The industrial truck A is at the beginning of a corridor 42 formed between two racks 40 and suitable for travelling along. In the ground 44 there is a pothole 46, the position and possibly extent of which is determined when driving through with the industrial truck A. Along the route suitable for travelling in the corridor 42 there are also on the left side two pallets of items 48 and 50 protruding from the racks, the pallet 48 standing on the ground 44 and the pallet 50 lying on a shelf of the rack 40.

Furthermore, a pipeline 52 runs along in the upper region of the racks 40, as a further irregularity to be considered.

The position and extent of the pothole 46, of the pallets 48 and 50 and of the pipe 52 are recorded by the sensors provided on the industrial truck A and subsequently stored. Then the control data for the driving operation of the industrial truck A or B and possibly further industrial trucks are automatically derived from this.

Such control data for the irregularities described may, for example, take the following form:

If the outline of the industrial truck comes into the area of the pothole 46, so that there is the risk that one of its wheels could enter the pothole, the speed of the industrial truck is reduced or limited, for example to half the top speed. A reduction of the speed is also conceivable in an area 60, which is delimited by two lines in FIG. 3 and extends over the entire width of the corridor 42, so that the size of the industrial truck does not have to be considered.

In the case of the pallet of items 48 standing on the ground 44, a speed reduction or restriction may be provided in a way similar to in the case of the pothole 46, so that safe driving past the pallet 48 is ensured. Furthermore, it is also conceivable to stipulate areas to the side of the pallet 48 that lead to the industrial truck being stopped if its outline overlaps one of the areas 62. Collisions between the industrial truck and the pallet, and consequently damage to the items, could be avoided in this way.

In the case of the pipe 52, a lifting height reduction or limitation may be activated, so that a raised load is lowered in good time before driving through under the pipe 52, to a height which makes it possible to drive through under the pipe 52 without colliding with it. The lifting height limitation is based, for example, on a clearance h to be maintained by the item or the load part from the pipe 52. If lowering of the load part is necessary during driving to allow the pipe 52 to be passed, a speed reduction during the lowering of the load part could also be additionally instigated.

On account of the pallet of items 50 protruding from the rack 40, located on an upper shelf of the rack, a lifting height limitation may be provided, for example, during passing, coming into effect for example when the industrial truck drives past very close to the pallet 50, for example with a lateral clearance of less than 20 cm. If the clearance is greater, unrestricted passing may be allowed.

In addition or as an alternative to automatic control, it is also conceivable for the driver to be given corresponding warnings of obstacles on a display or the like, so that he can appropriately respond and influence the driving operation. In this sense, the means for influencing driving operation may be signal transmitters that cause the driver of the industrial truck to control the vehicle with reduced speed and/or limited lifting height as long as it is in the vicinity of the detected irregularity. In the case of an automatic intervention of the control system, it is also possible for an acoustic warning signal and/or an optical warning indication to be output to the driver at a time before or at the same time, so that the driver is informed why, for example, the industrial truck is automatically braked. Such an indication will also increase the acceptance on the part of the drivers of a control system intervening in manual driving operation.

The examples given serve only to illustrate the basic idea of the control system presented. It is clear that controlling the driving operation according to irregularities on the route can also be organized differently. It must also be considered in particular in this respect that, as far as possible, normal operation is not restricted. This means, for example, that the industrial truck must be able to move unhindered in the direction required for picking up one of the pallets 48, 50, to be specific substantially orthogonally in relation to the path followed by the corridor, towards the pallets 48, 50.

The obstacles illustrated in FIGS. 3 and 4 are shown purely by way of example and it is clear that the frequency of irregularities represented does not necessarily correspond to reality. It goes without saying that, in an implementation of the proposed control system, it must also be considered that a number of irregularities influence the driving operation control in their own particular way and corresponding case scenarios have to be taken into consideration.

With reference to FIGS. 3 and 4, it is finally also pointed out that sensors for recording irregularities may also be provided on the racks 40 or at other suitable places in a warehouse or on an outdoor site. Sensors 70, which are formed for example as scanners for recording three-dimensional data or as cameras, are indicated in FIGS. 3 and 4 by dots.

For the sake of completeness, it is also pointed out that the positional determination of the industrial trucks may be performed by way of known techniques, such as for example GPS, radio location, induction loops and the like. The proposed system can be used for both automatically operated and manually operated industrial trucks.

Finally, attention should also be drawn to the following aspect of the invention. The data on irregularities along the route that are recorded by the sensor device and stored in the memory device 17 may also be used for the purpose of influencing the maintenance management of the industrial truck or number of industrial trucks in the sense that, if irregularities that may speed up the wear of the industrial truck in question are present, maintenance intervals are shortened or, possibly, special preventive maintenance of the industrial truck in question is initiated, for instance by an indication on a display of the control system or the industrial truck. Such irregularities that speed up wear may be, for example, potholes, abrupt bumps in the carriageway or zones of particular roughness or undulation of the carriageway. Furthermore, the control system may be designed for the purpose of evaluating the data on irregularities of the route that are recorded in the memory device 17 in order to provide service information or special maintenance requirement information.

An increased need for steering, braking and restarting of the industrial truck in question in the case of irregularities of the route can also be derived from the stored data and considered in the maintenance management.

This aspect of the invention makes it possible in an advantageous way to optimize the maintenance management of the industrial truck or of an entire fleet of industrial trucks.

Influencing the maintenance management may be performed on the basis of statistical evaluation of the data on irregularities of the route and their positions that are recorded in the memory device 17. Advantageously, the sensor device 14 concerned comprises counting means, in order to count how often an industrial truck in question has passed positions with previously detected irregularities, then, using the accumulated number, derive a brought-forward, routine or possibly even deferred maintenance requirement of the industrial truck. Even for this aspect of the invention it may be adequate that the presence of irregularities is recorded in assignment of their positions along the route by a sensor device, for instance an on-board sensor device 14, of an industrial truck or even a separate test vehicle, and the data stored in the memory device 17 concerned are then evaluated for the maintenance management of further industrial trucks. The aspect of influencing the maintenance management of one or more industrial trucks in the sense explained above is of importance in its own right within the scope of the present invention, for example in the sense that, in the case of a system according to one or more of claims 1 to 11, the means (16) for influencing driving operation are substituted by means for determining a desired point in time for the next maintenance of the industrial truck according to the data of the sensor device that are stored in the memory device 17.

The invention claimed is:

1. An industrial truck control system for influencing the driving operation of an industrial truck according to one or more irregularities having positions along a route to be traveled by the industrial truck, comprising:
    one or more sensors configured to identify at least one of said irregularities and record data regarding the position of said irregularity;
    a memory device for storing the data recorded by said one or more sensors; and
    a controller adapted to adjust a lifting height of a load part of the industrial truck based on a position of the industrial truck and the stored data regarding the position of said irregularity.

2. The industrial truck control system of claim 1, wherein said one or more sensors is an optical and/or electromagnetic and/or mechanical sensor.

3. The industrial truck control system of claim 1, wherein said one or more sensors includes a sensor configured to determine the position of the industrial truck.

4. The industrial truck control system of claim 1, wherein said irregularities are recorded automatically or by manual input.

5. The industrial truck control system of claim 1, wherein said one or more irregularities include unevennesses of a surface along the route.

6. The industrial truck control system of claim 1, wherein said one or more irregularities include narrow points or obstacles along the route.

7. The industrial truck control system of claim 1, wherein said controller is further configured to influence a speed of the industrial truck and/or steer the industrial truck.

8. The industrial truck control system of claim 1, wherein said controller is adapted to adjust the lifting height of a load part of the industrial truck automatically.

9. The industrial truck control system of claim 1, wherein said control system in mounted on said industrial truck.

10. The industrial truck control system of claim 1, further comprising:
    a first transmitting/receiving unit configured to transmit said recorded data; and
        a central computer that includes a second transmitting/receiving unit, wherein said central computer is configured to receive said recorded data from said industrial truck,
    determine control data, and
    transmit control data to one or more industrial trucks.

11. A method of influencing the driving operation of an industrial truck according to one or more irregularities having positions along a route to be traveled by the industrial truck, comprising:
    identifying, using one or more sensors, at least one of said irregularities;
    recording data regarding the position of said irregularity;
    storing the data recorded by said one or more sensors in a memory; and
    adjusting a lifting height of a load part of the industrial truck based on a position of the industrial truck and the stored data regarding the position of said irregularity.

12. The method of claim 11, wherein said one or more sensors is an optical and/or electromagnetic and/or mechanical sensor.

13. The method of claim 11, further comprising:
    determining the position of the industrial truck using at least one of said one or more sensors.

14. The method of claim 11, wherein said one or more irregularities include unevennesses of a surface along the route.

15. The method of claim 11, wherein said one or more irregularities include narrow points or obstacles along the route.

16. The method of claim 11, further comprising:
    influencing a speed of the industrial truck and/or steering the industrial truck.

17. The method of claim 11, wherein the lifting height of the load part of the industrial truck is adjusted automatically.

18. The method of claim 11, further comprising: transmitting said recorded data from said industrial truck;
    receiving said recorded data at a central computer;
    determining control data, and
    transmitting said control data to one or more industrial trucks.

19. The method of claim 18, wherein said control data is transmitted to a different industrial truck.

20. The method of claim 19, wherein said identifying occurs during a learning trip.

21. An industrial truck control system for influencing the driving operation of an industrial truck according to one or more irregularities having positions along a route to be traveled by the industrial truck, wherein said irregularities include at least one of a pothole, obstacle, unevenness of a surface along said route, and a narrow passage, comprising:
    one or more sensors configured to identify at least one of said irregularities and record data regarding the position of said irregularity;
    a memory device for storing the data recorded by said one or more sensors; and
    a controller adapted to adjust a lifting height of a load part of the industrial truck based on a position of the industrial thick and the stored data regarding the position of said irregularity.

22. A method of influencing the driving operation of an industrial truck to avoid one or more irregularities having positions along a route to be traveled by the industrial truck, comprising:
- identifying, using one or more sensors, at least one of said irregularities;
- recording data regarding the position of said irregularity;
- storing the data recorded by said one or more sensors in a memory; and
- adjusting a lifting height of a load part of the industrial truck based on a position of the industrial truck and the stored data regarding the position of said irregularity,
- wherein said irregularities include at least one of a pothole, obstacle, unevenness of a surface along said route, and a narrow passage.

* * * * *